Dec. 6, 1932.  C. D. MILLER  1,889,996
METHOD AND MEANS FOR THE MEASUREMENT OF VISCOSITY
Filed March 19, 1924  3 Sheets-Sheet 1
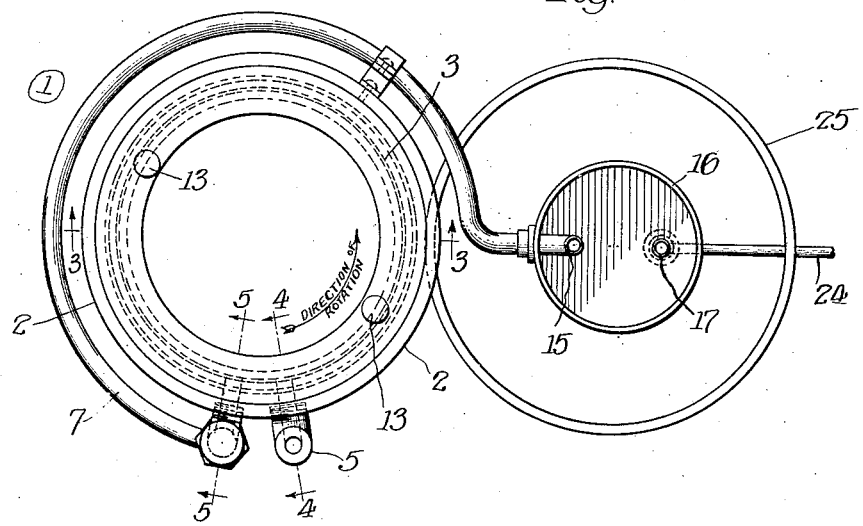
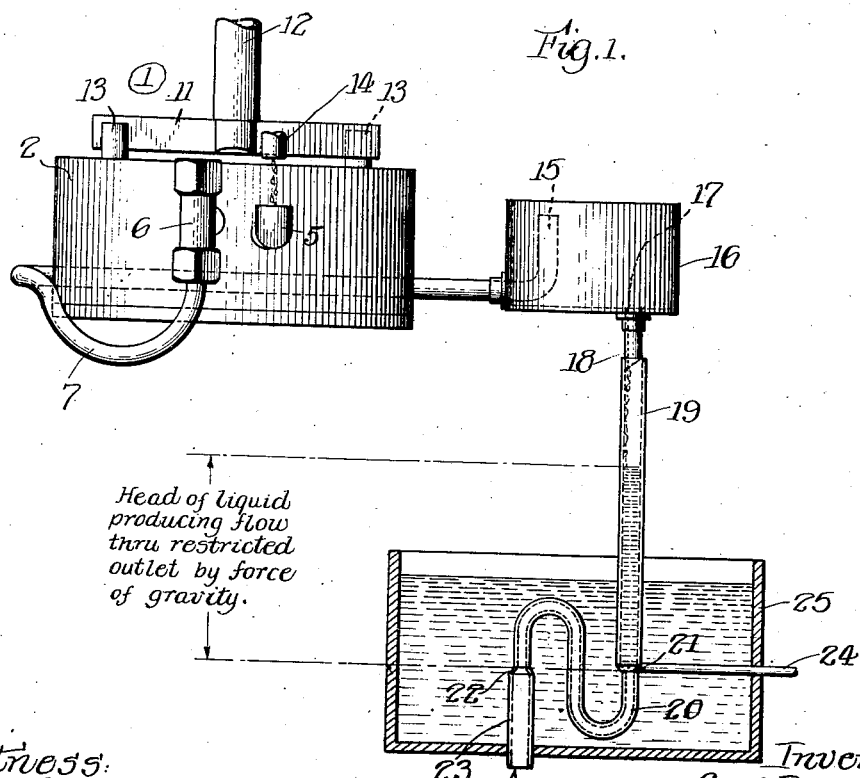

Dec. 6, 1932.  C. D. MILLER  1,889,996
METHOD AND MEANS FOR THE MEASUREMENT OF VISCOSITY
Filed March 19, 1924     3 Sheets-Sheet 2
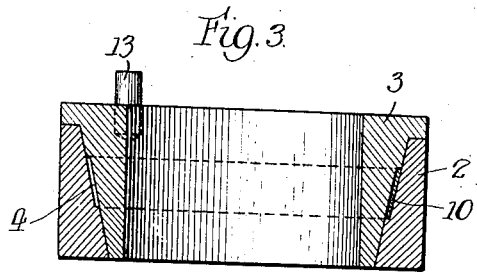
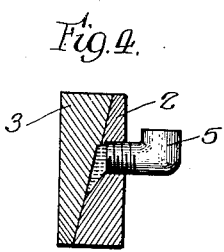
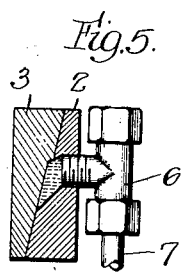
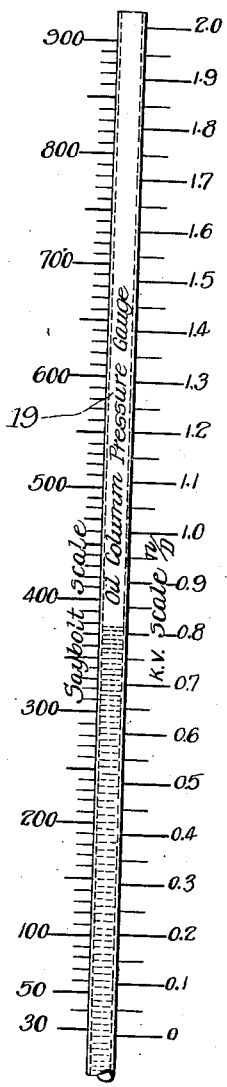
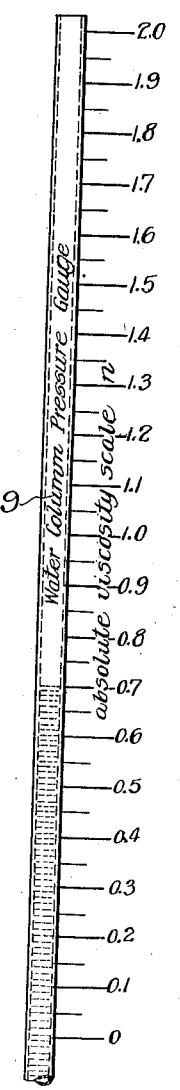
Witness:
G. J. Sauser.
Inventor:
Carl D. Miller,
By Wilkinson, Huxley, Byron & Knight
Attys.

Dec. 6, 1932. C. D. MILLER 1,889,996
METHOD AND MEANS FOR THE MEASUREMENT OF VISCOSITY
Filed March 19, 1924 3 Sheets-Sheet 3
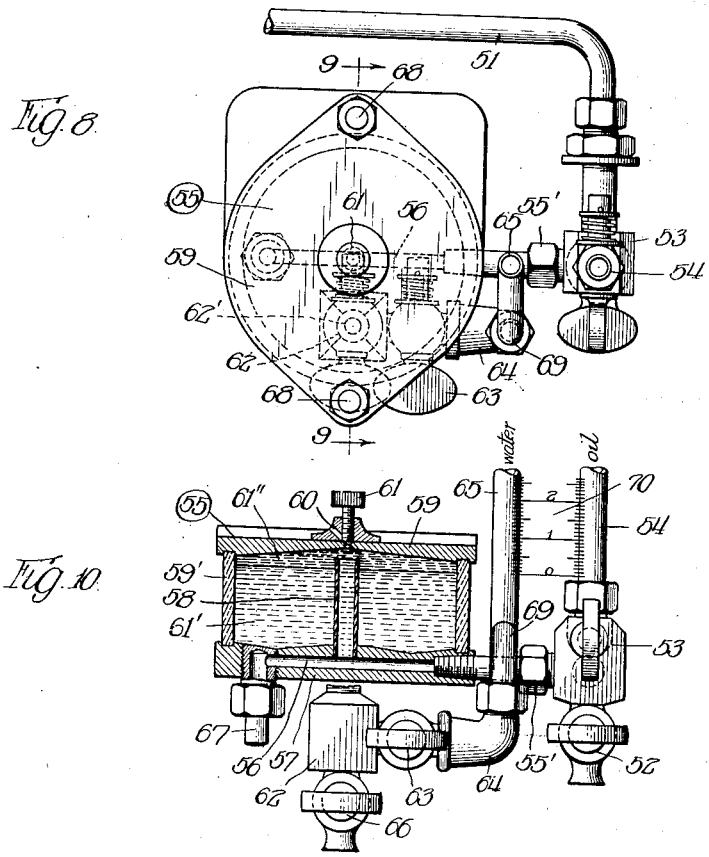
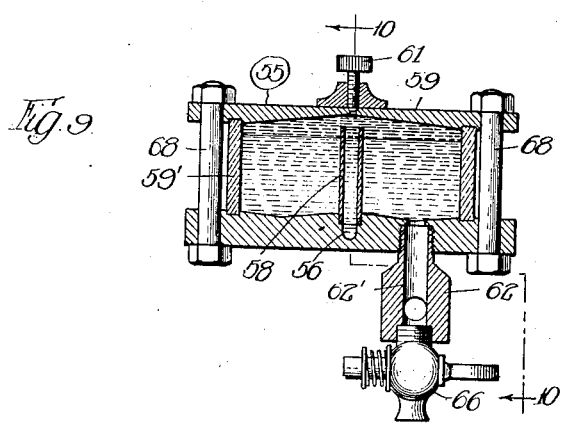
Witness:
A. J. Sauser
Inventor:
Carl D. Miller,
By Wilkinson, Huxley, Byron & Knight
Attys Patented Dec. 6, 1932

1,889,996

UNITED STATES PATENT OFFICE

CARL D. MILLER, OF CHICAGO, ILLINOIS

METHOD AND MEANS FOR THE MEASUREMENT OF VISCOSITY

Application filed March 19, 1924. Serial No. 700,207.

The present invention relates to improvements in methods and means for the measurement of viscosity.

More particularly the present invention relates to methods and means for giving a continuous indication of the viscosity of a liquid, as, for example, oil. Certain practical features of the present invention accrue from the provision of a constant flow of the liquid under test, and, for the purpose of producing said constant flow, it is preferred to use the structure illustrated and described in United States Letters Patent No. 1,727,836 granted September 10, 1929, to the present applicant. It will be understood, however, that the invention is not limited to use with the apparatus referred to, but may be used with any device which gives substantially constant flow regardless of viscosity.

An object of the present invention is to provide a method for indicating the viscosity of a continuously flowing liquid under test.

A further object is to provide a method and means for indicating directly the viscosity of a flowing sample of liquid in physical units.

A further object is to provide means for indicating the viscosity of a continuously flowing sample of fluid.

Further objects will appear as the description proceeds.

Referring to the drawings—

Figure 1 is a view in side elevation of an instrument embodying the principles of the present invention;

Figure 2 is a top plan view of the structure shown in Figure 1;

Figures 3, 4 and 5 are views on an enlarged scale of the details of the structure shown in Figures 1 and 2;

Figures 6 and 7 indicate scales by means of which viscosity may be measured according to certain arbitrary ratings.

Figure 8 is a view in top plan of apparatus by means of which readings may be conveniently had either of the coefficient of viscosity (absolute viscosity) or of viscosity according to an arbitrary scale, according to the Saybolt, Redwood, or Engler system.

Figure 9 is a view in section taken along the plane indicated by the arrows 9—9 of Figure 8; and Figure 10 is a sectional view taken along the planes indicated by the arrows 10—10 of Figure 9.

The description of the present invention may be prefaced by a short description of a device for producing constancy of flow of a fluid regardless of its viscosity. Such an instrument is indicated in Figures 1 and 2 by the numeral 1. The principles of said instrument are based upon the tendency of liquid to move along with solid surfaces with which it may be in contact. So long as the velocity of the liquid does not rise above a certain critical velocity, the motion of said liquid is known as a "stream line", or "non-sinuous motion". Under such conditions any pressure produced is proportional to the velocity of the moving solid surface and to the true viscosity of the liquid. For the purpose of simplifying the indications, the velocity of the moving solid surface may be kept substantially constant. Regardless of the liquid under test, any pressure produced will be substantially proportional to the viscosity of said liquid. By using a manometer, the liquid in which is the same as the liquid under test, the so-called kinematic viscosity of the liquid under test is indicated on an evenly divided scale. By suitable calibration, indications according to any arbitrary system, such as the Saybolt, Redwood, or Engler, may be had. Referring to the instrument marked 1 in Figures 1 and 2, an apparatus is illustrated having a relatively stationary part within which revolves a movable part, said stationary and movable parts having a space between them in which is located the fluid, which may be oil, whose viscosity is to be measured. The liquid is drawn along through this space by rotation of the movable part. Liquid is introduced into this space through a suitable inlet and drawn along through it by rotation of the movable part. After passage for some distance along this space, the liquid is forced to pass through an outlet by the termination of the space between the relatively moving solid surfaces.

The relatively stationary part of the apparatus marked by the numeral 1 is indicated by the numeral 2, which member will be referred to herein as the stator. Snugly fitting with a running fit within the stator 2 is the rotor 3. The stator 2 and rotor 3 are illustrated in Figures 3, 4 and 5 as having conical contacting surfaces, an annular space 4 being provided between said stator and rotor for the reception of the liquid under test. The numeral 5 indicates a pipe connection whereby liquid may be led into the space 4. The numeral 6 indicates an outlet connection leading from the annular space 4, said outlet connection 6 being provided with the outlet pipe 7.

Located in the annular space 4 between the connections 5 and 6 is the filler or stop 10. According to the structure as illustrated in Figure 1, the inlet connection 5 is located in the region where the surface of the rotor 3 is leaving the stop 10 and the outlet connection 6 is located in the region where the surface of the rotor 3 is approaching the stop.

The rotor 3 may be rotated by means of a driving bar 11 mounted on the end of the driving shaft 12. Said driving bar contacts with the upstanding pins 13—13 which project from the upper side of the rotor 3. Though the type of drive is subject to wide variation, the one illustrated has the advantage that it permits the rotor to bear properly in the stator and eliminates lateral pressure from the driving mechanism.

A feed tube 14 may be provided through which liquid may be conducted to the inlet connection 5. Liquid may be conducted to the inlet connection 5 at a rate somewhat faster than said liquid is actually conducted through the instrument, the excess liquid dripping over the connection 5 into any suitable receptacle placed below said connection 5. Figure 1 illustrates drops of liquid falling from the feed tube 14, excess drops falling below the connection 5, which construction insures a sufficient supply of liquid at a constant level and consequently a constant pressure, the pressure being determined by the height of the overflow surface, which height is affected only slightly by variations, within limits, in the amount of liquid coming from the feed tube 14.

Preferably the outlet terminal 15 of the outlet tube 7 is on the same level as the inlet 5, a construction which is desirable for the purpose of eliminating the effect of gravitational force.

The outlet 15 is located within the receptacle 16, which receptacle 16 is provided with the outlet connection 17. Said outlet connection 17 has its opening 18 so constructed and placed that the fluid under test flows down the inside surface of the vertically placed tube 19, which may be a gauge. The tube 19 has a restricted portion 20 intermediate of its length, which restricted portion may be of S-shaped conformation, as a matter of convenience. The inlet 21 to the restricted portion 20 should preferably be at the same level as the outlet 22 from said restricted portion. The tube 19 at the outer end of its restricted portion may be provided with the enlarged portion 23, along the interior wall of which the fluid under test may drip. It will be noted that both ends of tube 19 are subjected to atmospheric pressure. For convenience in terminology, the restricted portion 20 of the tube 19 and the portions at the two extremities thereof may be considered as three tubes connected together in series. The tube 19 at the inlet to the restricted portion 20 will be provided with the tube 24, which may lead to any suitable type of pressure gauge. The restricted portion 20 of the tube 19 is preferably immersed in a bath in the receptacle 25. Said bath may be maintained at a constant temperature by any preferred means. The pressure difference of the liquid at the point of entry and the point of exit of the restricted passage may, of course, be measured by the height of accumulation of liquid within the tube 19.

Referring to Figures 8, 9 and 10, an instrument is disclosed which may be connected to the source of pressure produced in the liquid under test for the purpose of indicating either the coefficient of viscosity (absolute viscosity) or viscosity according to an arbitrary scale.

The numeral 51 indicates a tube which may be connected to the source of pressure, as for example—to the tube 24, Figure 1. A drain cock 52 may be provided and a cock 53 is provided for controlling communication to the pressure gauge 54, which pressure gauge may contain the liquid under test, which liquid has been referred to herein as oil. The pressure is carried to the oil water reservoir 55 through the connection 55′, which connection 55′ communicates with a conduit 56 in the metal bottom 57 of the reservoir 55. Communicating with the conduit 56 is the central vertical tube 58 which opens into the reservoir above. The top of said reservoir is indicated by the numeral 59, and the glass wall thereof is indicated by the numeral 59′. The top 59 has an air vent 60, which may be closed by means of the screw 61. Assuming that the apparatus is to be used for the indication of the viscosity of oil, the lower part of the reservoir 55 will contain water, indicated by the numeral 61′. Lying above the supply of water 61′ is a layer of oil 61″, which will be of a nature approximating that under test. At fitting 62 is provided, which communicates with the bottom of the reservoir through the opening indicated by the numeral 62′. Pressure communicated through the oil at the top of the reservoir forces water down through the connection 62, through the stop cock 63 and the elbow 64, and up into the tube 65 to such a height that the water column in tube 65 balances the pressure communicated through the reservoir 55. A drain cock 66 is provided for draining the reservoir 55 when desired. The numeral 67 indicates a connection for attaching a pressure gauge, as for example—a recording pressure gauge. The parts of the reservoir may be tightly held together by means of the bolts 68—68. The tube 65 may be bent intermediate of its length, as indicated by the numeral 69, whereby the indicating part of said tube 65 will be in proximity to the indicating part of tube 54. A scale 70 may be provided having separate calibrations for the two tubes 65 and 54.

The reservoir 55 is placed at a height which brings the level of the points 21 and 22 of Figure 1 near the top of the reservoir 55. Water is supplied to said reservoir 55 up to this level. Oil is then allowed to enter the reservoir through the pipe 51, connection 55, conduit 56 and tube 58, the air vent 60 being opened by the screw 61. It will be understood, of course, that the oil is forced into the reservoir 55 while the rotor 3 is being driven. After the reservoir 55 has been filled with oil, the vent 60 is closed by means of screw 61, the machine is stopped and the oil and the water in the gauge tubes come to the level of the top of the inlet points 21 and 22 of Figure 1. The scale 70 is then adjusted so that its zero mark is at this level and the device is ready for use. The tube 54 of Figure 10 corresponds with the tube 19 of Figure 6, and the tube 65 of Figure 10 corresponds to the tube 9 of Figure 7. The calibrations of the scale 70 associated with the tube 54 give readings of viscosity according to an arbitrary system, indicated as the Saybolt system in Figure 6. This scale may be calibrated according to an empirical formula to indicate seconds Saybolt.

In explaining the functions of the above described embodiment of the present invention, let $a$ represent the distance between the opposite radially spaced walls of the annular space 4, $V$ the velocity of the moving surface, $w$ the dimension of the liquid stream parallel to the radially spaced walls of space 4, i. e., the distance between the dotted lines of Figure 3 measured along the slant of the conical surface, $Q$ the volume of liquid which flows in unit time under the condition of unobstructed flow: then $Q$ equals $(\tfrac{1}{2})waV$. As applied to the instrument 1, the above formula is approximate only. Said formula applies strictly only to plane surfaces, while the surfaces between which the motion occurs in this instrument are not plane but conical. Approximately, however, the actual flow of liquid from the outlet 15 is represented by the formula $(\tfrac{1}{2})waV$. The frictional resistance in the inlet and outlet will result in reducing the flow somewhat, the amount of said reduction, however, being the same for all liquids. Inasmuch as constant velocity of the moving surface of rotor 3 is assumed, all the factors in said formula are constants. A constant flow is delivered from the outlet 15, which constant flow will be delivered, according to the disclosure in Figures 1–5, to outlet connection 17 of the receptacle 16. The flow through the tube 7 is shown to be constant by the accepted laws and formulas of physics. This constancy of flow can be deduced from formulas (1) and (5) of Patent 1,727,836. Formula (1) is written $Q = \tfrac{1}{2}waV$. Rearrangement of formula (5) gives $1-f = 1/(32wa^3l/(3\pi d^4L)+1)$. The flow through the tube 7 is denoted by the expression $(1-f)Q$. The value of this flow is obtained by multiplying the two above expressions, which gives $(1-f)Q = \tfrac{1}{2}waV/(32wa^3l/(3\pi d^4L)+1)$.

It is to be noted that this expression for the flow contains only numerical constants, the dimensions of the duct, the dimensions of the tube, and the speed of the rotor. The flow $(1-f)Q$ is fixed solely by these. It is not affected by the viscosity of the liquid. The liquid having a constant flow from outlet 17 runs down the interior of tube 19. The relatively small opening 18 at the bottom of connection 17 is so placed relative to the tube 19 that the fluid under test will spread over the interior wall of tube 19 instead of flowing freely in a stream or by drops into said tube 19. The size of connection 17 is such that there is no rise of liquid in the receptacle 16 above the top of the tube 15. Inasmuch as the restricted portion 20 of the tube 19 offers a considerable resistance to the flow of liquid therethrough, there will be an accumulation of liquid in the tube 19 above the point of entry 21, the amount of such accumulation depending upon the thickness or viscosity of said liquid. The level of such accumulation of liquid in tube 19 will adjust itself to produce constancy of flow from tube 19, and the kinematic viscosity of the liquid under test may be read on a scale associated with tube 19, as for example, either of the scales shown in Fig. 6.

As is well known, the scale of kinematic viscosities can be calibrated to read directly in the arbitrary scales of so-called "efflux" instruments, such as the Saybolt, Redwood and Engler instruments for determining the viscosity of oils. In the case of thinner oils, the inertia of the liquid gives a considerable effect in limiting the rate of flow, so that on an evenly divided scale of kinematic viscosities the scales giving the equivalent readings of these instruments are not evenly divided. This point is illustrated in Figures 6 and 7. According to Figure 7, an oil having an absolute viscosity of .69 has a kinematic viscosity of .82 units, and its viscosity in Saybolt seconds is 375. The absolute viscosity .69 is read on the gauge 9. The point .82 is read on the kinematic viscosity scale of the oil gauge 19 and 375 is read on the Saybolt scale of the oil gauge 19.

The arrangement above described offers the decided advantage with regard to the maintenance of constant temperature which is generally an important factor in the measurement of viscosity. According to the present invention, the instrument indicated by the numeral 1 need not be kept at the required constant temperature, only a portion of the tube 19 including the restricted portion 20 being required to be kept at predetermined temperature. The maintenance of constant temperature is thereby greatly facilitated and accuracy of results is easily obtainable.

It will be understood, of course, that in making readings with the instrument as illustrated, it will be necessary, just as it is in any measuring instrument, to allow sufficient time for the instrument to pass through the transition stage when the viscosity of the liquid being tested is undergoing change. Expressed in other words, readings are to be taken when the level within the tube is steady.

The pressure necessary to overcome the frictional resistance of the liquid in the restricted part 20 of the tube 19 is supplied by the gravitational head of the liquid above the point 21 of the tube 19. This appears from the fact that points 21 and 22 are on a level, so that there is no tendency of the liquid in part 20 to flow either way, except by the pressure due to the gravitational head above the point 21, in the tube 19. Measurement of the pressure at point 21 therefore is a measure of the pressure at this point due to gravitational head, which is the pressure which overcomes the frictional resistance of the liquid in the restricted part 20, and which produces the flow through this part 20.

As noted above, a constant flow of liquid to the outlet 17 may be provided by any other preferred means rather than the device 1. Many other modifications will occur to those skilled in the art. It is intended to cover all such modifications that fall within the scope of the invention as defined by the appended claims.

What is claimed is:

1. The method of measuring the viscosity of a liquid which consists in providing a constant flow of said liquid regardless of viscosity, causing said liquid to flow through a liquid conductor having a restricted passage which offers a resistance to the flow of said liquid, and measuring the pressure difference of said liquid at said point of entry into said restricted passage and the point of exit of said liquid from said restricted passage.

2. The method of measuring the kinematic viscosity of a liquid which consists in providing a constant flow of said liquid regardless of viscosity, causing said liquid to flow through a liquid conductor having a restricted passage which offers a resistance to the flow of said liquid so that an accumulation of liquid is established above said restricted passage, and measuring the pressure difference of said liquid at said point of entry into said restricted passage and the upper level of said accumulation of liquid, the points of entry and exit of said restricted passage being at substantially the same level.

3. Apparatus for measuring the kinematic viscosity of a liquid, comprising means for setting up a constant flow of said liquid regardless of viscosity, a liquid conductor placed in a position to receive said liquid, said conductor being sufficiently large and being so placed relative to said flow that said liquid will flow down on the inside surface of said conductor without falling freely into said conductor, said conductor having a restricted portion open at its discharge end to the atmosphere.

4. Apparatus for measuring the kinematic viscosity of a liquid, comprising means for setting up a constant flow of said liquid regardless of viscosity, a liquid conductor placed in a position to receive said liquid, said conductor being sufficiently large and being so placed relative to said flow that said liquid will flow down on the inside surface of said conductor without falling freely into said conductor, said conductor having a restricted portion open at its discharge end to the atmosphere, the point of entry and exit of said restricted portion being at the same level.

5. The method of measuring the kinematic viscosity of a liquid which consists in providing a constant flow of said liquid regardless of viscosity, causing said liquid to flow through a liquid conductor having a restricted passage which offers a resistance to the flow of said liquid so that an accumulation of liquid is established above said restricted passage, and measuring the pressure difference of said liquid at said point of entry and the upper level of said accumulation of liquid, said restricted portion being immersed in a bath of constant temperature.

6. The method of measuring the kinematic viscosity of a liquid which consists in providing a constant flow of said liquid regardless of viscosity, causing said liquid to flow through a restricted passage which offers a resistance to the flow of said liquid so that a pressure difference is established between the point of entry to said restricted passage and the point of exit from said passage, and measuring the pressure difference of said liquid at said points of entry and exit.

7. The method of measuring the kinematic viscosity of a liquid which consists in providing a constant flow of said liquid regardless of viscosity, causing said liquid to flow through a restricted passage which offers a resistance to the flow of said liquid so that a pressure difference is established between the point of entry to said restricted passage and the point of exit from said passage, and measuring the pressure difference of said liquid at said points of entry and exit, said points of entry and exit being at substantially the same level.

8. The method of measuring the kinematic viscosity of a liquid which consists in providing a constant flow of said liquid regardless of viscosity, causing said liquid to flow through a restricted passage which offers a resistance to the flow of said liquid so that a pressure difference is established between the point of entry to said restricted passage and the point of exit from said passage, and measuring the pressure difference of said liquid at said points of entry and exit, said points of entry and exit being at substantially the same level, said restricted portion being kept at a constant temperature.

9. Apparatus for measuring the kinematic viscosity of a liquid, comprising means for setting up a constant flow of said liquid regardless of viscosity, a liquid conductor placed in a position to receive said liquid, said conductor being sufficiently large and being so placed relative to said flow that said liquid will flow down on the inside surface of said conductor without dropping freely into said conductor, said conductor having a restricted passageway open at its discharge end, and means for measuring the pressure difference between the point of entry and the point of exit of said restricted portion.

10. Apparatus for measuring the kinematic viscosity of a liquid, comprising means for setting up a constant flow of said liquid regardless of viscosity, a liquid conductor placed in a position to receive said liquid, said conductor being sufficiently large and being so placed relative to said flow that said liquid will flow down on the inside surface of said conductor without dropping freely into said conductor, said conductor having a restricted passageway open at its discharge end, means for measuring the pressure difference between the point of entry and the point of exit of said restricted portion, and a bath adapted to be maintained at a constant temperature for immersing said restricted portion.

11. Apparatus for measuring the kinematic viscosity of a liquid, comprising means for setting up a constant flow of said liquid regardless of viscosity, a liquid conductor placed in a position to receive said liquid, said conductor being sufficiently large and being so placed relative to said flow that said liquid will flow down only on the inside surface of said conductor, said conductor having a restricted passageway open at its discharge end, and means for measuring the pressure difference between the point of entry and the point of exit of said restricted portion, said points of entry and exit being at the same level.

12. Apparatus for measuring the kinematic viscosity of a liquid, comprising means for setting up a constant flow of said liquid regardless of viscosity, a liquid conductor placed in a position to receive said liquid, said conductor being sufficiently large and being so placed relative to said flow that said liquid will flow down only on the inside surface of said conductor, said conductor having a restricted passageway open at its discharge end, means for measuring the pressure difference between the point of entry and the point of exit of said restricted portion, said points of entry and exit being at the same level, and a bath adapted to contain a liquid of constant temperature for immersing said restricted portion.

13. The method of measuring the viscosity of a liquid which consists in directing a constant flow of said liquid regardless of viscosity into a receptacle having a restricted outlet and measuring the accumulation of liquid above said outlet.

14. Apparatus for measuring the kinematic viscosity of a liquid, comprising means for supplying a constant flow of said liquid regardless of viscosity, a liquid conductor open at both ends to the atmosphere, said conductor being provided with a restricted portion and having means associated therewith for measuring the height of liquid in said conductor above the entrance to said restricted portion.

15. Apparatus for measuring the kinematic viscosity of a liquid, comprising means for supplying a constant flow of said liquid regardless of viscosity, a liquid conductor open at both ends to the atmosphere, said conductor being provided with a restricted portion and having means associated therewith for measuring the height of liquid in said conductor above the entrance to said restricted portion, said restricted portion being tortuous in conformation and having its outlet at the same level as the entrance thereto.

16. The method of measuring the ratio of viscosity to density of a liquid which consists in producing constant flow of said liquid regardless of viscosity, offering a resistance to said flow to produce a pressure, and measuring said pressure in a gauge tube containing liquid approximating that under test in such a manner that the pressure is determined by the rise of said liquid in said gauge tube against the force of gravity.

17. Apparatus for measuring the viscosity of oils and similar liquids comprising means for producing a constant flow of said liquid regardless of viscosity and for offering a resistance to said flow so as to produce a pressure, a closed reservoir, means for connecting said source of pressure to said reservoir whereby pressure is transmitted through the liquid under test to the interior of said reservoir, a tube containing a liquid approximating that under test, said connecting means being connected to said tube in such a manner that the pressure in said connecting means causes a rise of the fluid in said tube against the force of gravity, a second gauge tube connected with said reservoir, the lower portion of said reservoir and the lower part of said second tube containing water, the upper portion of said reservoir containing liquid approximating that under test, said connecting means having communication with said oil whereby rise in pressure will drive water from said reservoir up into said second tube against the force of gravity.

18. The method of measuring the viscosity of a liquid which consists in causing a constant flow of said liquid regardless of viscosity, causing said liquid to run down the side of a relatively large tube, causing said fluid to escape by gravitational force through a relatively small tube, the resistance to flow in said large tube being relatively small so that an accumulation of liquid obtained in said large tube encounters substantially no resistance except that offered by the small tube when the liquid flows out through said small tube, whereby the head of the fluid in said accumulation will, due to gravity, cause an outflow from said small tube equal to the inflow down the side of said large tube, and measuring the height of said accumulation.

19. Apparatus for measuring the viscosity of a liquid, comprising means for setting up a constant flow of said liquid, a liquid conductor placed in a position to receive said liquid, said conductor being sufficiently large and being so placed relative to said flow that said liquid will flow down on the inside surface of said conductor without falling freely into said conductor, said conductor having a restricted portion, a closed reservoir connected to said conductor, said reservoir containing two liquids of different specific gravity, the lighter of which approximates the liquid under test, the point of entry and the point of exit of said restricted portion and the dividing line between the liquids in said reservoir being substantially at the same level, said conductor having communication with the uppermost of the liquids in said reservoir, and a pressure indicator having communication with the lowermost of the liquids in said reservoir.

20. Apparatus for the use of measuring the viscosity of oil, comprising a closed reservoir, two liquids of different specific gravities within said reservoir, the lighter of which approximates the liquid under test, means controlling communication to said reservoir whereby the dividing line between said liquids may be adjusted, means for communicating pressure of the liquid under test to the uppermost of said liquids in said reservoir, and indicating means communicating with the lowermost of the liquids in said reservoir.

21. The method of measuring the viscosity of a liquid which consists in maintaining a constant flow of said liquid regardless of viscosity and measuring the pressure of said liquid under said constant flow.

22. Means for measuring the viscosity of a liquid comprising means for maintaining substantially constant the flow of said liquid regardless of viscosity and means for measuring the pressure set up in said liquid under conditions of constant flow.

Signed at Winnipeg, Manitoba, this thirteenth day of March, 1924.

CARL D. MILLER.